(12) United States Patent
Yuan

(10) Patent No.: US 10,476,963 B2
(45) Date of Patent: Nov. 12, 2019

(54) SYSTEM AND METHOD FOR CONTACTING VEHICLE FOR TANDEM PARKING

(71) Applicant: Honda Motor Co., Ltd., Minato-ku, Tokyo (JP)

(72) Inventor: Alvin T Yuan, Carson, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/149,860

(22) Filed: May 9, 2016

(65) Prior Publication Data

US 2017/0320490 A1 Nov. 9, 2017

(51) Int. Cl.
*B60W 30/06* (2006.01)
*H04L 29/08* (2006.01)

(52) U.S. Cl.
CPC .............. *H04L 67/12* (2013.01); *B60W 30/06* (2013.01)

(58) Field of Classification Search
CPC ................................ B60W 30/06; H04L 67/12
See application file for complete search history.

(56) References Cited

U.S. PATENT DOCUMENTS

| | | | |
|---|---|---|---|
| 9,008,890 B1* | 4/2015 | Herbach | B60W 30/00 701/26 |
| 9,135,580 B1* | 9/2015 | Lyman | G06Q 10/02 |
| 2002/0186144 A1* | 12/2002 | Meunier | G07B 15/00 340/4.6 |
| 2006/0204056 A1* | 9/2006 | Steinberg | G06T 5/00 382/118 |
| 2009/0026254 A1 | 1/2009 | Johnson et al. | |
| 2009/0174574 A1* | 7/2009 | Endo | B60R 1/00 340/932.2 |
| 2009/0207046 A1* | 8/2009 | Arrighetti | G06K 9/3258 340/937 |
| 2011/0182703 A1* | 7/2011 | Alan | E04H 6/183 414/231 |
| 2012/0323643 A1* | 12/2012 | Volz | G07B 15/02 705/13 |
| 2013/0085596 A1* | 4/2013 | Shani | E04H 6/285 700/217 |

(Continued)

FOREIGN PATENT DOCUMENTS

| | | |
|---|---|---|
| KR | 2013-0127226 A | 11/2013 |
| WO | WO 03/009251 A1 | 1/2003 |

OTHER PUBLICATIONS

U.S. Non-Final Office Action dated Sep. 12, 2018 issued in co-pending U.S. Appl. No. 15/852,587.

*Primary Examiner* — Rodney A Butler
(74) *Attorney, Agent, or Firm* — Arent Fox LLP

(57) ABSTRACT

Systems and methods for tandem parking are provided. A vehicle includes a camera that obtains an image of a second vehicle parked in tandem with the first vehicle. The vehicle also includes a processor that extracts a vehicle identifier of the second vehicle from the image. The vehicle further includes a wireless modem that sends, from the vehicle, a notification request for the second vehicle including the vehicle identifier. A method of notification includes scanning, by the camera mounted in the first vehicle, a vehicle identifier from a second vehicle parked in tandem with the first vehicle. The method further includes transmitting, by the wireless modem operably connected to the camera, a notification request for the second vehicle including the vehicle identifier.

12 Claims, 7 Drawing Sheets

(56) References Cited

U.S. PATENT DOCUMENTS

| | | |
|---|---|---|
| 2013/0238441 A1 | 9/2013 | Panelli |
| 2013/0325564 A1 | 12/2013 | Kwong |
| 2014/0214499 A1* | 7/2014 | Hudson ................. G07F 17/246 |
| | | 705/13 |
| 2014/0309871 A1* | 10/2014 | Ricci ....................... B60Q 1/00 |
| | | 701/36 |
| 2015/0039173 A1* | 2/2015 | Beaurepaire .......... B60W 30/06 |
| | | 701/23 |
| 2015/0039213 A1 | 2/2015 | Stefan et al. |
| 2015/0130641 A1 | 5/2015 | Rahman et al. |
| 2015/0202975 A1 | 7/2015 | Solomon et al. |
| 2015/0312353 A1 | 10/2015 | Chen et al. |
| 2015/0321667 A1 | 11/2015 | Fukata et al. |
| 2015/0370255 A1 | 12/2015 | Harvey |
| 2015/0381551 A1 | 12/2015 | Cai et al. |
| 2016/0019492 A1 | 1/2016 | Juhasz et al. |
| 2016/0031338 A1 | 2/2016 | Penilla et al. |
| 2016/0189435 A1 | 6/2016 | Beaurepaire |
| 2016/0224028 A1* | 8/2016 | Harvey ............... B62D 15/0285 |
| 2016/0313731 A1* | 10/2016 | Leppanen .......... B62D 15/0265 |
| 2016/0373710 A1* | 12/2016 | Kawasaki ................ H04N 9/68 |
| 2017/0076290 A1* | 3/2017 | Corfitsen ........... G06Q 20/3255 |
| 2017/0132477 A1 | 5/2017 | Kim et al. |
| 2017/0166218 A1* | 6/2017 | Hoare ................. B60W 40/105 |
| 2017/0234976 A1 | 8/2017 | Grauer et al. |
| 2019/0066517 A1* | 2/2019 | Neser ..................... G08G 1/205 |

* cited by examiner

SYSTEM AND METHOD FOR CONTACTING VEHICLE FOR TANDEM PARKING

BACKGROUND

Parking in urban environments is often limited. Multi-level parking garages increase parking space by allowing multiple vehicles to occupy the same geographic coordinates. Multi-level parking garages, however, also use a lot of available space for roads and ramps that are needed to access each level. Further, multi-level parking garages, for example, those located beneath office buildings, may not have optimal dimensions for parking cars.

One solution for increasing parking spaces is to allow tandem parking. In a tandem parking scenario two or more cars are parked end-to-end. Walls, columns, or other vehicles may be located to the sides of the tandem parked cars. Accordingly, tandem parking increases the number of vehicles that may be parked in a given space. Usually, the first car to park in a tandem spot is blocked from exiting the parking spot by a subsequent (e.g., second, third, etc.) car. This creates a situation where the first car waits for a driver(s) of the subsequent car(s) to remove their vehicles before the first car may exit the parking spot. A driver of the first car may be unable to contact the driver(s) of the subsequent car(s) and may be unable to move the first car.

In view of the foregoing, tandem parking systems and methods that provide the ability to contact the blocking vehicle are provided. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure a method of notification includes scanning, by a camera mounted in a first vehicle, a vehicle identifier from a second vehicle parked in tandem with the first vehicle. The method further includes transmitting, by a wireless modem operably connected to the camera, a notification request for the second vehicle including the vehicle identifier.

In another aspect, a method for tandem parking includes receiving, via a wireless modem of a first vehicle, a request to move the first vehicle. The method further includes confirming that the first vehicle is parked in a tandem parking position with a second vehicle. The method also includes performing a driverless maneuver to allow the second vehicle to exit the tandem parking position in response to the request.

In another aspect, the disclosure provides a vehicle including a camera that obtains an image of a second vehicle parked in tandem with the vehicle. The vehicle also includes a processor that extracts a vehicle identifier for the second vehicle from the image. The vehicle further includes a wireless modem that sends, from the vehicle, a notification request for the second vehicle including the vehicle identifier.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
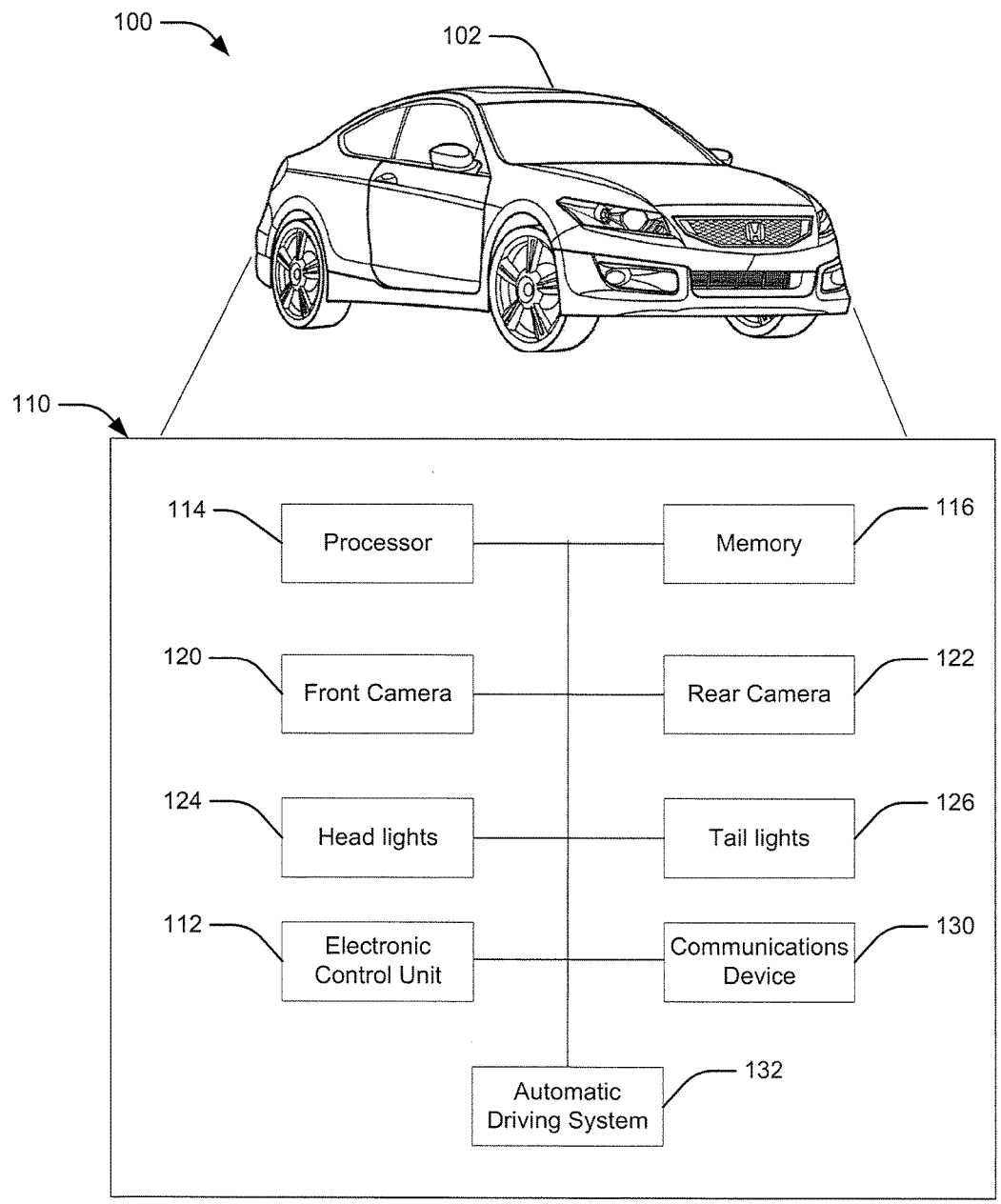
FIG. 1 illustrates a schematic view of an example operating environment of a notification system in accordance with aspects of the present disclosure.

Generally described, the present disclosure provides for parking notifications for tandem parking situations. Turning to FIG. 1, a schematic view of an example operating environment 100 of a vehicle notification system 110 and example methods according to an aspect of the disclosure is provided. The vehicle notification system 110 may reside within a vehicle 102. The components of the vehicle notification system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle notification system 110, among others, including vehicle HVAC systems, vehicle audio systems, vehicle video systems, vehicle infotainment systems, vehicle telephone systems, and the like. The notification system 110 may include a front camera or other image-capturing device (e.g., a scanner) 120 and rear camera or other image capturing device (e.g., a scanner) 122 that may also be connected to the ECU 112 to provide images of the environment surrounding the vehicle 102, as described in further detail below. The notification system 110 may also include a processor 114 and a memory 116 that communicate with the front camera 120, rear camera 122, head lights 124, tail lights 126, communications device 130, and automatic driving system 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle notification system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include a front camera 120 and a rear camera 122. Each of the front camera and the rear camera may be a digital camera capable of capturing one or more images or image streams, or may be another image capturing device, such as a scanner. For example, the rear camera 122 may be a rear parking camera. The rear camera 122 may provide an image of a space directly behind the vehicle 102. For example, the rear camera may be located above a bumper of the vehicle. The front camera 120 may be a dashboard camera. The front camera 120 may capture an image of a space directly in front of the vehicle 102. In a tandem parking scenario, an image captured by the front camera 120 and/or rear camera 122 may include an identifier of a vehicle parked directly in front of or behind the vehicle 102. For example, the image may include a license plate number of the tandem parked vehicle. Additionally, a quick response (QR) code may be located on the vehicle and provide a different identifier, such as a vehicle identification number (VIN). The front camera 120 and/or rear camera 122 may also provide the image to an automatic driving system 132, which may include a lane keeping assistance system, a collision warning system, or a fully autonomous driving system, among other systems.

The vehicle 102 may include head lights 124 and tail lights 126, which may include any conventional lights used on vehicles. The head lights 124 and tail lights 126 may be controlled by the vehicle notification system 110 and/or ECU 112 for providing various notifications. For example, the head lights 124 and tail lights 126 may assist with scanning an identifier from a vehicle parked in tandem with the vehicle 102. For example, the head lights 124 and/or tail lights 126 may be activated or controlled to provide desirable lighting when scanning the identifier from the vehicle parked in tandem. The head lights 124 and tail lights 126 may also provide information such as an acknowledgment of a remote command (e.g., a move request) by flashing.

Figure 2:
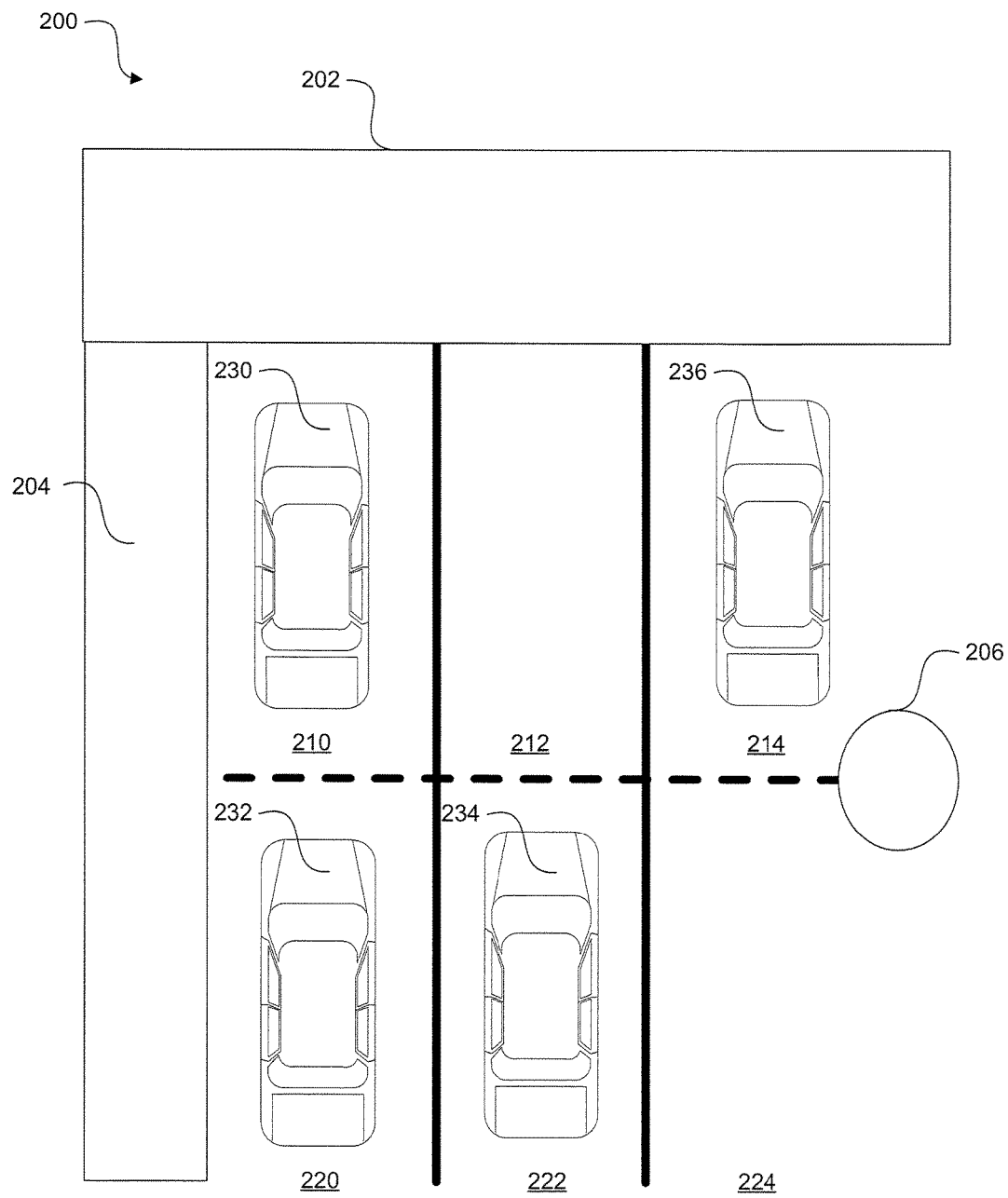
FIG. 2 illustrates an example of a tandem parking scenario involving multiple vehicles in a parking facility.

FIG. 2 illustrates an example of a tandem parking scenario involving an electric vehicle supply equipment 240 and multiple vehicles in a parking facility 200. The parking facility 200 may be, for example, a parking garage or a parking lot. The parking facility 200 may include a front boundary 202, which may be, for example, a wall or an edge of the parking lot. The front boundary 202 may also be designated by painted lines, a fence, a barrier or any other indication. The parking facility 200 may also include a side boundary 204. The side boundary 204 may be similar to the front boundary 202, but located along a length of one or more parking spaces. Additionally, the parking facility may include additional obstacles 206 that may limit parking space. For example, obstacles 206 may include support columns, light posts, or other objects that interfere with a regular pattern of parking spaces.

The parking facility 200 may define a plurality of parking spaces arranged in rows and columns. Spaces arranged such that the long sides of the spaces are adjacent may be considered a row of spaces. For example, as illustrated in FIG. 2, a first row of parking spaces includes spaces 210, 212, and 214, and a second row of parking spaces includes spaces 220, 222, and 224. Spaces arranged such that the short sides of the spaces are adjacent are also interchangeably referred to herein as a column of spaces. For example, as illustrated in FIG. 2, a first column of spaces includes space 210 and space 220, a second column of spaces includes space 212 and space 222, and a third column of spaces includes space 214 and space 224. Vehicles that are parked in spaces within the same column may be considered to be parked in tandem. For example, as illustrated, vehicle 230 and vehicle 232 are parked in tandem. The vehicles 230, 232, 234, 238 may each be an example of the vehicle 102.

Tandem parking offers benefits in terms of space management and efficiency. For example, as illustrated in FIG. 2, the front boundary 202, side boundary 204, and obstacle 206 may prevent placement of an access lane that allows direct access to spaces 210 and 212. Allowing tandem parking in the parking facility 200 may increase the total number of parking spaces available within a given area. Tandem parking, however, may present inconveniences for the drivers of the vehicles. For example, the vehicle 230 may be prevented from leaving by the vehicle 232. The vehicle 230 may be unable to drive directly out of the parking space 210. Generally, parking facilities using tandem parking may require drivers who park in a second row (e.g., parking spaces 220, 222, and 224) to leave a key with an attendant or valet so that the vehicle 232 may be moved if the vehicle 230 needs to be moved first. Drivers, however, may feel reluctant or inconvenienced when leaving a key with a garage attendant. Moreover, not all parking facilities may employ an attendant or valet, or it may be inconvenient to locate such a person within the parking facility. Additionally, some drivers may attempt to avoid the tandem parking scenario, for example, by parking in space 222 while space 212 remains empty. Such parking strategies may reduce the total capacity of the parking facility 200.

By equipping one or more of the vehicles 230, 232, 234, 236 with the notification system 110, the vehicles 230, 232, 234, 236 may help reduce the problems associated with tandem parking. For example, a vehicle 230 may initiate a process for moving the vehicle 232 such that the vehicle 230 may exit the parking space 210.

Figure 3:
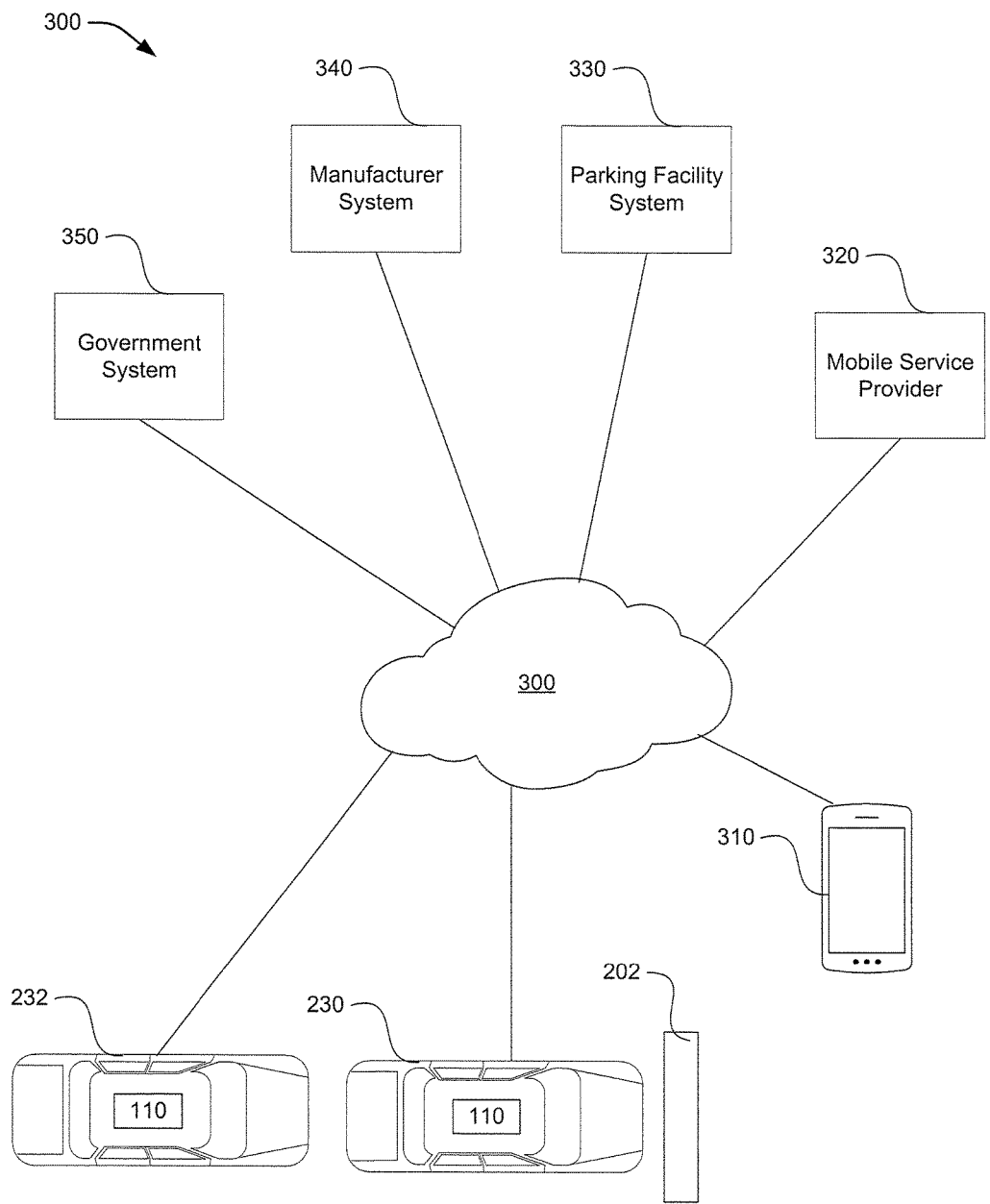
FIG. 3 illustrates an exemplary network for managing a notification system.

FIG. 3 illustrates an exemplary network 300 for managing a notification system 110. The network 300 may be a communications network that facilitates communications between multiple systems. For example, the network 300 may include the Internet or another internet protocol (IP) based network. The network 300 may enable the notification system 110 to communicate with a mobile device 310, a mobile service provider 320, a parking facility system 330, a manufacturer system 340, or a government system 350.

The notification system 110 within each vehicle 230, 232 may communicate with the network 300 via the communications device 130. The notification system 110 may, for example, transmit an identifier of a tandem parked vehicle to the parking facility system 330, the manufacturer system 340, or the government system 350. The notification system 110 may also receive a notification from another vehicle or from the parking facility system 330, manufacturer system 340, or government system 350. For example, the vehicle 232 may receive a notification indicating that the vehicle 232 should be moved. If the vehicle 232 includes an automatic driving system, the vehicle 232 may perform a driverless maneuver to allow the vehicle 230 to exit the tandem position.

The mobile device 310 may be a personal mobile device of a driver of a vehicle. The mobile device 310 may have different contact information than the notification system 110. For example, the mobile device 310 may have a telephone number, a device identifier (e.g., a mobile equipment identifier (MEID), an electronic serial number (ESN), or an international mobile equipment identify (IMEI)), an IP address, an email address, and/or a username associated with a service or application. The mobile device 310 may be registered in association with the vehicle 232 with one or more of the mobile service provider 320, parking facility system 330, manufacturer system 340, or government system 350, or within the vehicle 232. The notification system 110 of vehicle 230 may determine the contact information of the mobile device 310 via one or more registrations. The mobile device 310 associated with the vehicle 232 may receive a notification indicating that the vehicle 232 needs to be moved (e.g., to allow the vehicle 230 to exit the parking space). For example, the notification may be a message asking the driver to return to the vehicle 232 and move the vehicle 232. The notification may also be a message asking for consent for an automatic driving system 132 to move the vehicle 232. Another example message may indicate that the automatic driving system 132 has moved the vehicle 232 to a different parking space.

The mobile service provider 320 may be an entity that provides service to the mobile device 310 and/or the communications device 130. For example, the communications device 130 may include a wireless modem that operates on a cellular network. The mobile service provider 320 may store information regarding the vehicle 232 and/or a driver or mobile device 310 associated with the vehicle 232. For example, the communications device 130 may share an account with the mobile device 310. In another aspect, the mobile service provider 320 may store vehicle information (e.g., license plate number and/or VIN number) for any vehicle including a communications device 130 to which the mobile service provider 320 provides network service. The mobile service provider 320 may provide a portal (e.g., a website or web service) allowing a notification system 110 to contact another notification system 110 or the mobile device 310 based on vehicle information. For example, the notification system 110 of the vehicle 230 may transmit a move request to the mobile service provider 320 including the vehicle information, and the mobile service provider 320 may automatically forward the move request to the vehicle 232 and/or the mobile device 310.

The parking facility system 330 may include a computer system associated with the parking facility 200. The parking facility system 330 may also store registration information associated with each of the vehicles 230, 232, 234, 236 utilizing the parking facility 200. For example, the parking facility 200 may require a driver to register a license plate number and contact information when parking. Accordingly, the parking facility system 330 may act in a similar manner as the mobile service provider 320 described above. That is, the parking facility system 330 may receive a move request from a vehicle 230 and forward the message on to the vehicle 232 and/or the mobile device 310. The parking facility system 330 may also store information regarding a key or parking space associated with the vehicle 232. Accordingly, a valet may respond to the move request by obtaining the key associated with the vehicle 232 and going to the associated parking space to manually move the vehicle 232.

The manufacturer system 340 may include a computer system associated with one or more vehicle manufacturers or dealers. The manufacturer system 340 may also include registration information regarding a vehicle and/or driver. For example, the manufacturer system 340 may include an association of a VIN and/or license plate number with an identifier of the communications system. The manufacturer system 340 may further include contact information for the driver such as a telephone number for the mobile device 310. Accordingly, the manufacturer system 340 may operate in a similar manner to the mobile service provider 320 or parking facility system 330 discussed above.

The government system 350 may include a computer system associated with one or more government entities such as, for example, a department of motor vehicles. The government system 350 may also include registration information regarding a vehicle and/or driver. For example, the government system 350 may include an association of a VIN and/or license plate number with a driver of the vehicle 232. The government system 350 may further include contact information for the driver such as a telephone number for the mobile device 310. Accordingly, the government system 350 may operate in a similar manner to the mobile service provider 320 or parking facility system 330 discussed above.

Figure 4:
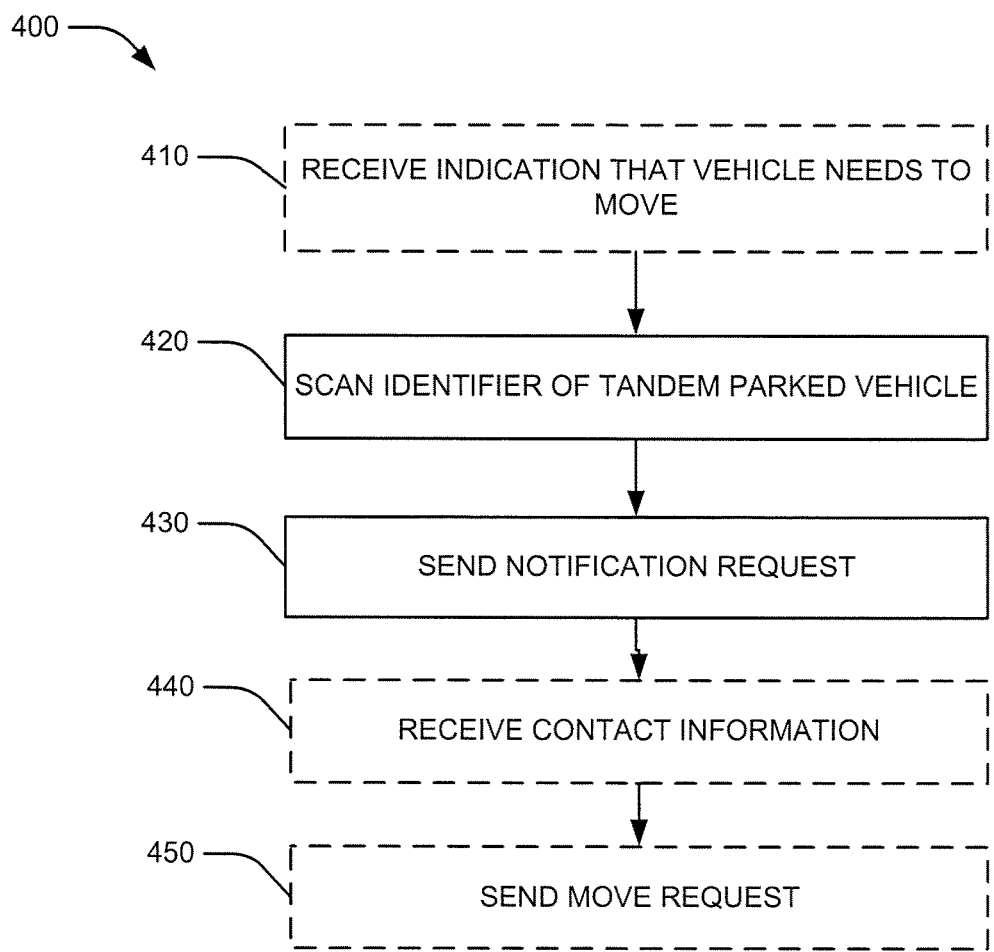
FIG. 4 illustrates a flowchart showing an exemplary method for providing notifications in a tandem parking scenario in accordance with aspects of the present disclosure.

FIG. 4 illustrates a flowchart of an example method 400 for providing notifications in a tandem parking scenario. The method 400 may be performed by a notification system 110 within a 102 that is in a tandem parking position such as vehicle 230 or vehicle 232.

In block 410, the method 400 may include receiving an indication that the vehicle 230 needs to move. In an aspect, for example, the notification system 110 may receive the indication that the vehicle 230 needs to move from a driver of the vehicle 230. For example, the driver of vehicle 230 may send a message via an application executing on a mobile device. The message may indicate that the driver intends to leave the parking space at a particular time or within a certain time period. For example, the driver may send the message when the driver has finished a particular task (e.g., making a purchase) at a location near the parking facility 200 and would like to be able to leave the parking space 210 when the driver returns to the vehicle 230.

In block 420, the method 400 may include scanning an identifier of a tandem parked vehicle. The scanning may be in response to receiving the indication in block 410. In an aspect, for example, the notification system 110 of the vehicle 230 may scan the identifier of the tandem parked vehicle using the front camera 120 and/or the rear camera 122. In another aspect, the scanning may be performed by the vehicle 232 when the vehicle 232 is first parked to determine whether the vehicle 232 is parked in a tandem position with vehicle 230. For example, the notification system 110 may activate the head lights 124 and/or tail lights 126 to illuminate the tandem parked vehicle while the front camera 120 and/or the rear camera 122 obtains an image of the tandem parked vehicle. If no vehicle is present in the tandem parking position, the notification system 110 may determine that the vehicle 230 is free to leave the parking space 210. The notification system 110 may continue to monitor the front camera 120 and/or the rear camera 122 to determine whether another vehicle enters the parking space 220. The notification system 110 may flash the head lights 124 and/or tail lights 126 or honk the horn if another vehicle attempts to park in space 220. If a vehicle is present in the tandem parking space 220, the image may include an identifier of the vehicle. For example, the license plate number of the tandem parked vehicle may be within the image. Another identifier such as a VIN number or QR code may also be within the image. The notification system 110 may analyze the image to determine the identifier using image processing software stored in memory 116 and executed by the processor 114. In another embodiment, scanning the identifier of a tandem parked vehicle may include taking a picture with an mobile device such as a mobile phone including a camera or a camera including communication capabilities. The mobile device may be associated with the first vehicle 230. For example, the mobile device may provide an image or information extracted from the image to the first vehicle 230.

In block 430, the method 400 may include sending a notification request. The notification request may be sent based on an available communications system. For example, the notification system 110 may use the communications device 130 to send the notification request via a WWAN if available. In some cases, however, WWAN service may be limited (e.g., due to underground parking), and the notification system 110 may send the notification request via an alternative system such as a WLAN provided by the parking facility 200. In another aspect, the notification system 110 may use V2V communication to relay the notification request to another vehicle with a WWAN or WLAN connection. In an aspect, the notification request may include information identifying both the vehicle 232 and the vehicle 230. The information identifying the vehicle 232 may be used to determine contact information for the vehicle 232 or driver thereof. The information identifying the vehicle 232 may be used for authentication to ensure that it is actually necessary to move the vehicle 232. The notification request may also include known contact information for the vehicle sending the notification request or the driver thereof. For example, when the vehicle 232 parks in the tandem parking position, the vehicle 232 may send a notification request including contact information so that the driver of vehicle 232 may be contacted to move the vehicle 232 when necessary.

The notification request may be sent to one or more of the mobile service provider 320, parking facility system 330, manufacturer system 340, or government system 350. In an aspect, the notification message may be sent to an entity that manages a notification service. For example, the parking facility system 330 or manufacturer system 340 may provide an application for submitting notification requests. The parking facility system 330 or manufacturer system 340 may then acquire information from another system if necessary. For example, if a manufacturer system 340 maintains a registry of VIN numbers and communication system identifiers but receives a notification request including only a license plate number, the manufacturer system 340 may contact the government system 350 to obtain a VIN number based on the license plate number.

In block 440, the method 400 may optionally include receiving contact information. In an aspect, for example, the communications device 130 may receive contact information from one or more of the mobile service provider 320, parking facility system 330, manufacturer system 340, or government system 350. The contact information may provide a point of contact for the vehicle 232 or driver thereof. For example, the contact information may be a telephone number, user name, or IP address.

In block 450, the method 400 may optionally include sending a move request to the vehicle 232 or driver thereof using the contact information. In an aspect, for example, the notification system 110 of the vehicle 230 may directly contact the notification system 110 of the vehicle 232 or the mobile device 310. For example, the notification system 110 may transmit the move request as a text message. The move request may include information identifying the vehicle 230, which may be used to authenticate the request. The vehicle 232 or driver thereof may move the vehicle 232 in response to the move request.

In an alternative embodiment, one of the mobile service provider 320, parking facility system 330, manufacturer system 340, or government system 350 may send the move request to the vehicle 232 and/or the mobile device 310 without sending contact information to the vehicle 232. The notification system 110 may also provide status updates and acknowledgments of any relevant communications within network 300. For example, the notification system 110 may receive a message indicating that a driver of vehicle 232 has received the move request and will be moving the vehicle 232 shortly.

Figure 5:
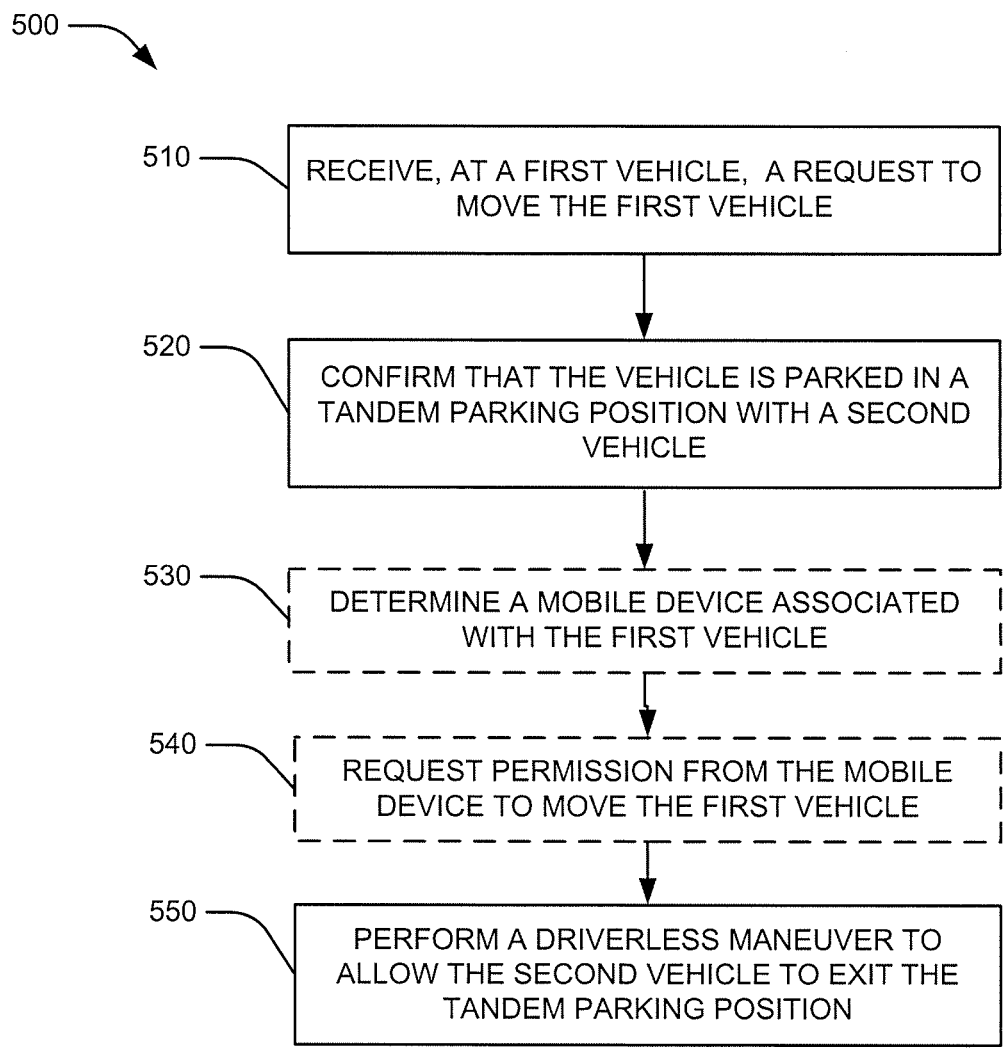
FIG. 5 illustrates a flowchart showing an exemplary method of moving a vehicle in response to a notification in accordance with aspects of the present disclosure.

FIG. 5 illustrates a flowchart of an example method 500 for moving a vehicle from a tandem parking position in response to a notification. The method 500 may be performed by a notification system 110 within a vehicle 232 that is in a tandem parking position that blocks another vehicle 230 from exiting the tandem parking position.

At block 510, the method 500 may include receiving, at a first vehicle, a request to move the first vehicle. In an aspect, for example, the vehicle 232 may receive the request to move the vehicle 232. The vehicle 232 may receive the request via the communications device 130. In an aspect, the communications device 130 may be activated while the vehicle 232 is parked via a V2V communication. For example, a pattern of flashing lights or horn honks may be used activate the communications device 130 for receiving a message via a radio-frequency (RF) communication protocol. The request may include an identifier of the vehicle 232 as well as an identifier of a second vehicle 230 requesting that the vehicle 232 move. For example, the identifier of the second vehicle 230 may include a license plate number of the second vehicle 230.

In block 520, the method 500 may include confirming that the vehicle is parked in a tandem parking position with a second vehicle. In an aspect, for example, the notification system 110 may use the front camera 120 and/or the rear camera 122 to confirm that the vehicle 232 is parked in a tandem parking position with the second vehicle 230. For example, the notification system 110 may obtain an image of both the front and rear of the vehicle and determine whether the vehicle 230 is in the obtained images. The notification system 110 may compare the identifier of the second vehicle 230 with an identifier extracted from the obtained images. The vehicle 232 may also confirm that the vehicle 232 is actually blocking the vehicle 230 from leaving a parking space. For example, the vehicle 232 may determine whether there is an alternative route that the vehicle 230 may use to leave the parking space 210.

In block 530, the method 500 may optionally include determining a mobile device associated with the first vehicle. In an aspect, for example, the notification system 110 may determine a mobile device 310 associated with the vehicle 232. Information identifying the mobile device 310 may be previously stored in the memory 116 by the driver of vehicle 232. For example, the mobile device 310 may have been previously paired with the notification system 110 via a Bluetooth or Wi-Fi connection. If more than one mobile device is associated with the vehicle 232, the notification system 110 may determine a most recent device associated with the vehicle 232 such as the most recent device to access the notification system 110 via the Bluetooth or Wi-Fi connection.

In block 540, the method 500 may optionally include requesting permission from the mobile device to move the first vehicle. In an aspect, for example, the notification system 110 may request permission via the communications device 130 from the mobile device 310 to move the vehicle 232. For example, the communications device 130 may place a call to the mobile device 310 with a recorded voice message asking for permission to move the vehicle 232. Alternatively, text based communications may be used, but may not illicit an immediate response. In another aspect, the vehicle 232 may move unless the mobile device 310 expressly denies the request within a certain time period.

In block 550, the method 500 may include performing a driverless maneuver to allow the second vehicle to exit the tandem parking position. In an aspect, for example, the notification system 110 may activate the automatic driving system 132 perform the driverless maneuver to allow the second vehicle 230 to exit the tandem parking space 220. A driverless maneuver may include any action that allows the vehicle 232 to move without a driver. For example, the automatic driving system may disengage a braking system and shift the vehicle 232 into a neutral gear to allow the vehicle 232 to be pushed. As another example, the automatic driving system may perform a pre-defined movement routine such as moving a prescribed distance directly forward or backward with or without turning the vehicle 232. Such a limited maneuver may allow the vehicle 230 to exit the tandem parking position without complicated navigation. The vehicle 232 may then perform a reverse pre-defined movement to return to the same parking space. In another aspect, the automatic driving system 132 may use front camera 120 and/or rear camera 122 as well as any other available sensors to navigate the vehicle 232 to a different available parking space. For example, the automatic driving system 132 may move the vehicle 232 from the space 220 to the space 224. In an aspect, the parking facility system 330 may provide an indication of an available parking space and/or navigation for reaching the available parking space.

Figure 6:
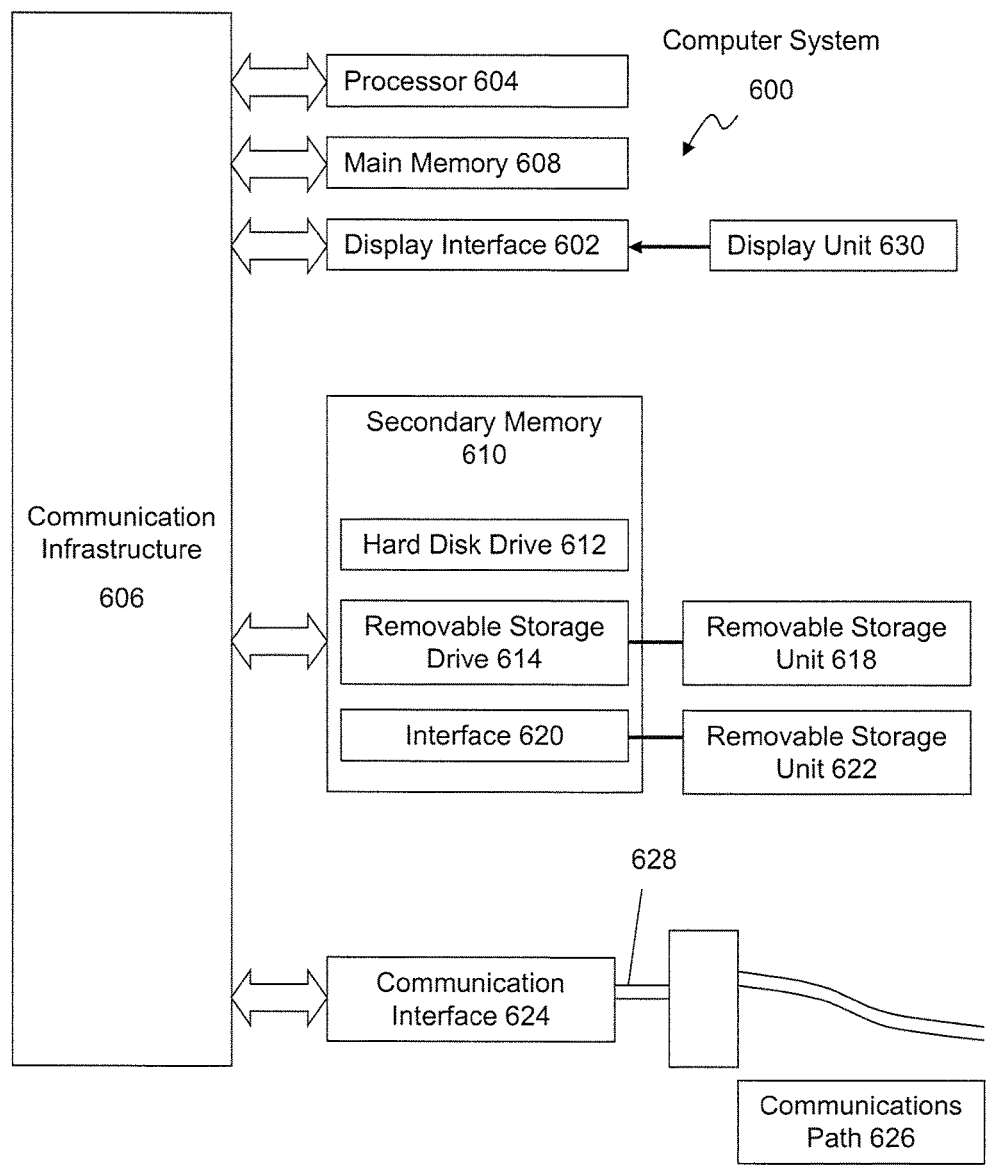
FIG. 6 presents an exemplary system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
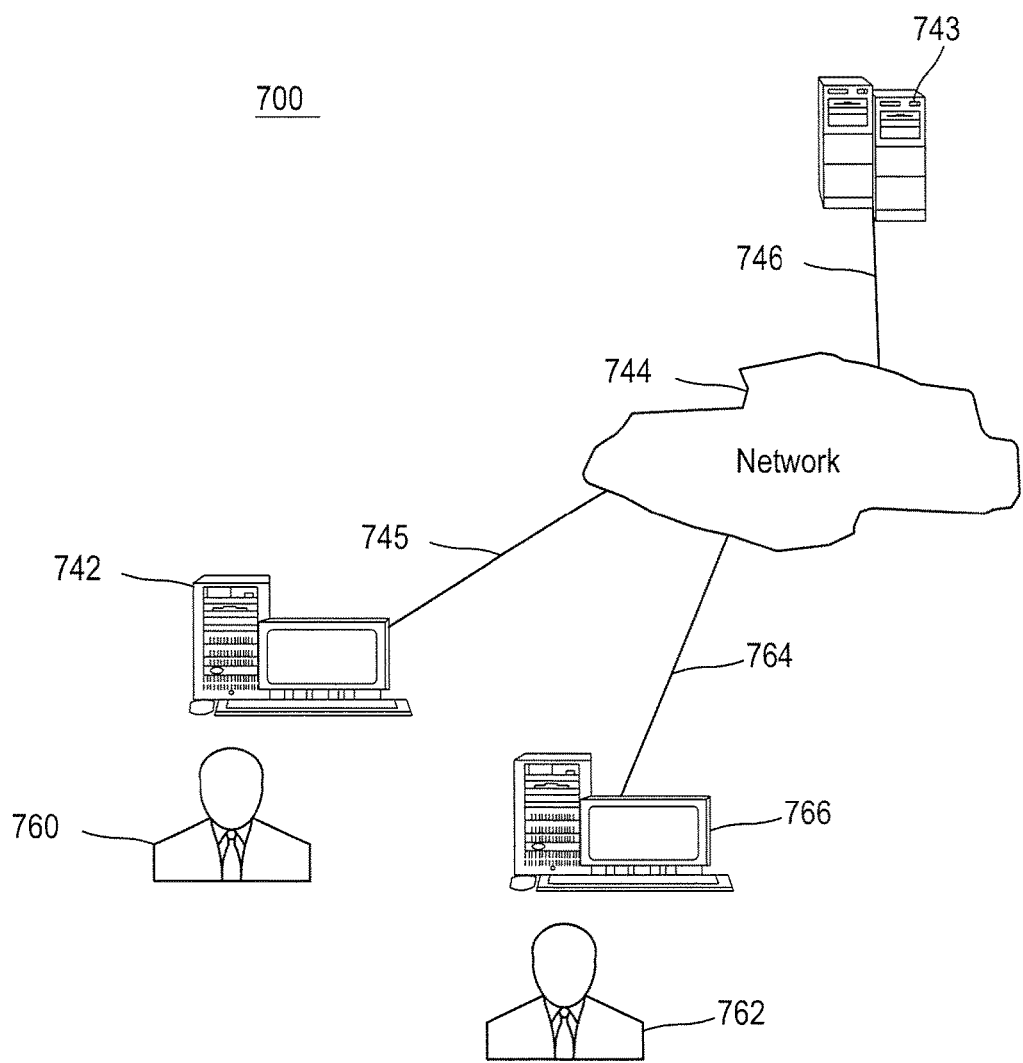
FIG. 7 is a block diagram of various exemplary system components for use in accordance with aspects of the present disclosure.

FIG. 7 is a block diagram of various example system components that may be used in accordance with aspects of the present disclosure. For example, the various components may be within the vehicle 102, or only some of the components may be within the vehicle 102, and other components may be remote from the vehicle 102. The system 700 includes one or more accessors 760, 762 (also referred to interchangeably herein as one or more "users") and one or more terminals 742, 766 (such terminals may be or include, for example, various features of the notification system 110 or network 300). In one aspect, data for use in accordance with aspects of the present disclosure is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of notification comprising:
  receiving, at a first vehicle, an indication from a driver of the first vehicle that the driver wants to move the first vehicle;
  scanning, by a camera mounted on the first vehicle that is parked in tandem with a second vehicle, an image including a vehicle identifier of the second vehicle parked in tandem with the first vehicle, wherein the driver of the first vehicle is remote from the first vehicle, and wherein the scanning is in response to receiving the indication;
  extracting, by a processor coupled to the camera, the vehicle identifier for the second vehicle from the image, wherein the extracting includes analyzing the image to determine the identifier;
  transmitting, by a wireless modem operably connected to the camera, a notification request for the second vehicle including the extracted vehicle identifier of the second vehicle;

receiving, in response to the notification request, via the wireless modem, contact information for the second vehicle; and transmitting, via the wireless modem, a request to move the second vehicle based on the contact information for the second vehicle.

2. The method of claim 1, further comprising illuminating the second vehicle with a light of the first vehicle while capturing the image.

3. The method of claim 1, wherein the identifier is a license plate number or quick response (QR) code.

4. The method of claim 1, wherein the transmitting comprises:
    transmitting the notification request to a server that provides a notification portal that processes notification requests including vehicle identifiers.

5. The method of claim 1, wherein the second vehicle performs a driverless maneuver to allow the first vehicle to exit the tandem position in response to the request.

6. The method of claim 5, wherein the second vehicle sends a notification to a user of the second vehicle indicating that the second vehicle has been moved.

7. A method for tandem parking comprising:
    receiving, via a wireless modem of a first vehicle a request to move the first vehicle;
    confirming that the first vehicle is parked in a tandem parking position with a second vehicle, wherein confirming that the vehicle is parked in a tandem parking position with the second vehicle comprises:
        obtaining an image from a front camera and an image from a rear camera;
        extracting an identifier of the second vehicle from one of the images; and
        determining that the second vehicle is present in one of the images when the identifier of the second vehicle matches a vehicle identifier of a requesting vehicle included in the request to move the first vehicle;
    determining a mobile device associated with the first vehicle;
    requesting permission, via the wireless modem, from the mobile device to move the first vehicle; and
    performing a driverless maneuver to allow the second vehicle to exit the tandem parking position in response to the request.

8. The method of claim 7, wherein confirming that the first vehicle is parked in a tandem parking position with a second vehicle comprises:
    determining that the second vehicle does not have an alternative route for exiting the tandem position.

9. The method of claim 7, wherein performing the driverless maneuver comprises disengaging a braking system of the first vehicle and shifting the first vehicle into a neutral gear.

10. The method of claim 7, wherein performing the driverless maneuver comprises:
    moving the first vehicle a prescribed distance away from the second vehicle without turning the first vehicle; and
    moving the first vehicle the prescribed distance in an opposite direction to return to the same parking space.

11. The method of claim 7, wherein performing the driverless maneuver comprises moving the first vehicle to another available parking space.

12. A first vehicle comprising:
    a camera that obtains an image of a second vehicle parked in tandem with the first vehicle;
    a processor that extracts a vehicle identifier for the second vehicle from the image;
    a wireless modem that sends, from the first vehicle, a notification request for the second vehicle including the extracted vehicle identifier of the second vehicle;
    an external light;
    an electronic control unit that turns the external light on while the camera obtains the image of the second vehicle; and
    an automatic driving system, wherein the wireless modem receives, at a first vehicle, a request to move the first vehicle, the request including a received vehicle identifier of the second vehicle;
    wherein the processor confirms that the first vehicle is parked in a tandem parking position with the second vehicle based on the extracted vehicle identifier of the second vehicle matching the received vehicle identifier of the second vehicle; and
    wherein the automatic driving system performs a driverless maneuver to allow the second vehicle to exit the tandem parking position in response to the request.

* * * * *